CIRCUIT ARRANGEMENT FOR FINAL SELECTORS WITH THREE LINE GROUPS ARRANGED IN ONE PLANE

Filed March 31, 1954

INVENTORS
K. SASS
K. KLINKHAMMER
BY Robert Harding Jr.
ATTORNEY

United States Patent Office 2,821,574

Patented Jan. 28, 1958

2,821,574

CIRCUIT ARRANGEMENT FOR FINAL SELECTORS WITH THREE LINE GROUPS ARRANGED IN ONE PLANE

Karl Sass Stuttgart-Stammheim, and Kurt Klinkhammer, Stuttgart-Zuffenhausen, Germany, assignors to International Standard Electric Corporation, New York, N. Y., a corporation of Delaware Application March 31, 1954, Serial No. 420,165

Claims priority, application Germany April 21, 1953

3 Claims. (Cl. 179—18)

The invention relates to a circuit arrangement for final selectors with three line groups arranged in one plane requiring one train of impulses for the setting of the selector to a lead of the first group of lines and two trains of impulses for setting the selector to the leads of the second or third group of lines.

In a conventional system, only one or two trains of impulses are required for setting the selector to one out of three groups of lines. In such systems the circuit arrangement is made in such a way that the third group of lines can only be attained if the wipers of the selector at the first train of impulses are set to an engaging point. Thereupon the second group of lines will be swept automatically. As may be taken from the above, only very quick-acting selectors are capable of meeting the requirements of such an arrangement, because the dialling interval between two trains of impulses depends on the calling subscriber and is likely, therefore, to be very short occasionally. For this reason it may happen that the subscriber is already sending out the second train of impulses before the selector has reached the third group of lines. The object of this invention is to overcome this drawback. This is achieved in that circuit components are provided which, when setting the selector to an engaging point of the second or third group of lines, act in such a way upon the driving magnet in response to the first train of impulses that, when sending out the second train of impulses, the selector will execute a double step each time it receives an impulse.

In accordance with the further embodiment of the invention the said engaging points for the second and third group of lines are arranged behind each other at the end of the first group of lines.

In case the wipers of the selector engage one of the two engaging points, then the driving magnet will be caused by the action of a relay combination to perform double steps each time an impulse of the second train of impulses is received. Therefore, the second and the third group of lines are so grouped with their leads at the contact bank of the selector that one lead of the second group and one lead of the third group are connected to the contact terminals in an alternating sequence.

Figure 2:
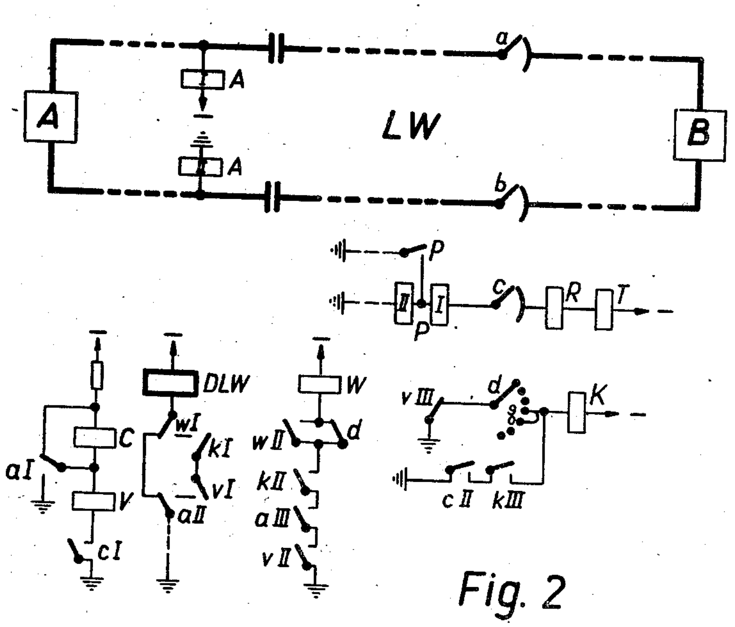
Figure 1:
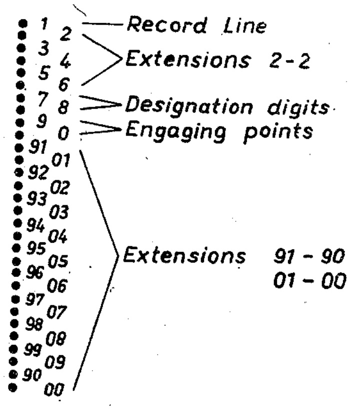

Further particulars regarding the invention may be taken from the following description of one embodiment shown as an example in Figs. 1 and 2 of the accompanying drawing. However, the scope of the invention is in no way limited thereto. Further only those circuit details which are necessary for enabling a better understanding of the invention are shown in the drawing.

The final selector of a small-type P. A. B. X-system is disclosed. A conventional type of rotary switch is employed as a selector. The arrangement of the groups of lines and the distribution of the numbers within the groups of lines may be seen from Fig. 1. Accordingly there are employed mixed digits, i. e. the digits 2–6, and 91–90 and 01–00 for the extensions. The digit 1 is reserved for the record line, and the digits 7 and 8 as designation digits, whereas the terminals 9 and 0 serve as engaging points for the decate or tens identification. The numbers 1–0 can be directly reached by dialling, but if the wipers of the final selector remain standing on the digits 9 or 0 after the first train of impulses, a relay K will be energized.

The corresponding control proceedings will be explained with reference to Fig. 2 of the drawing. The station user A is first of all supposed to dial the station user B having the numer 6. He will engage the final selector in the conventional way, e. g. from a group selecting stage, via the test wire in which the relay C will be energized: battery minus, resistor, C, *a*I, battery plus.

Relay A has already come up via the winding I, II. If the subscriber releases the required train of impulses, then the relay A will be pulsingly operated and the contact *a*II governs the driving magnet DLW: battery minus, DLW, *w*I, *a*II, further contacts, battery plus.

The selector will not set itself, e. g. to the sixth step, whereby the "engaged" test or busy test will be performed via the outgoing test wire by means of relay P. As soon as the test relay is energized, the speech connection will be connected through.

However, if the subscriber A wishes to call the subscriber 93, then he will first of all send out the first train of impulses (9 impulses) and will reach an engaging point. As soon as the relay V, which had been energized during the pulsing operation, has dropped off again on account of a short-circuit, the engaging point relay K will be operated via the contact *v*III and the wiper *d*: battery minus, K, terminal 9, wiper *d*, *v*III, battery plus.

The relay remains energized, independently of the position of the wiper, via one of its own contacts *k*III and a contact *c*II of the holding relay.

By dialling the digit 3 the subscriber initiates the sending out of a further train of impulses. This sequence of impulses comprises three impulses. At the first dropping of the relay A the driving magnet will receive one impulse via the contact *a*II. Apart therefrom the relay V will be energized via the contact *a*I. If the relay A pulls up again, then the relay W, because the circuit for the driving magnet is opened again, will be energized over the following path: battery minus, W, *d*, *k*II, *a*III, *v*II, battery plus.

Via the contacts *w*I, *k*I, *v*I, and *a*II the selector will receive another impulse, so that the latter will now stand with its wipers on the terminal of the digit 91 (Fig. 1).

At the second interruption, i. e. at the second drop of the relay A, the selector will again be controlled in the already described manner from the digit 91 to the digit 92 by way of a double step, and so on, until having reached the desired number. Thereafter the testing will be performed again via the outgoing test wire.

In a similar way also the contact terminals of the third group of lines 01 to 00 will be reached. In this case, however, the subscriber first dials the engaging point 0, by means of which from this point, when sending out the second train of impulses, the subscribers 01, to 02 etc. will be called by means of the double steps of the selector.

What is claimed is:

1. A circuit arrangement for final selectors comprising a final selector having a bank of contacts and wipers adapted to sweep over said contacts, said contacts being arranged in three groups, a first succession of contacts comprising the first group and a second succession of contacts comprising the second and third groups, the contacts of said second succession alternating between contacts of the second and third groups, means responsive to a first train of pulses for moving said wipers step-by-step to a contact of said first group, and means operated when said wipers reach either the next-to-the-last or the last contact of said first group for altering the operation of said wiper-moving means for causing said wipers to make two steps for each pulse of a second train of pulses, whereby said wipers are moved to a desired contact of said second or third group, depending on which of the last two contacts of the first group the wipers were resting at the end of the first train of pulses.

2. A circuit arrangement, according to claim 1, in which the wiper-moving-means comprises a pulse receiving relay and the means for altering the operation of said wiper-moving-means comprises a second relay, means for operating said second relay at the end of a first train of pulses if the wipers are resting on either one of the last two contacts of the first group of contacts, and means controlled by said pulse receiving relay and said second relay for causing the double operation of said wiper-moving-means for each pulse of the second train.

3. A circuit arrangement, according to claim 2, in which the means for altering the operation of the wiper-moving-means further comprises a third relay, and means for operating the wiper-moving-means under control of the contacts of said pulse receiving relay and said third relay.

References Cited in the file of this patent

UNITED STATES PATENTS

| | | |
|---|---|---|
| 1,527,820 | Powell | Feb. 24, 1925 |
| 1,572,222 | Powell | Feb. 9, 1926 |
| 1,837,801 | Vick et al. | Dec. 22, 1931 |
| 1,877,883 | Kahn | Sept. 20, 1932 |
| 1,891,423 | Kahn | Dec. 20, 1932 |
| 2,688,738 | Bellamy et al. | Sept. 7, 1954 |